(No Model.)
W. F. MARSH.
VEHICLE WHEEL.
No. 413,760. Patented Oct. 29, 1889.
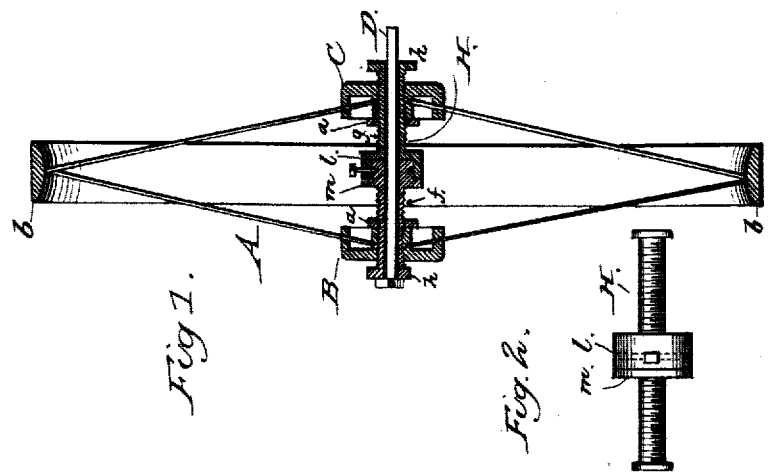
WITNESSES
T. W. Fowler
W. H. Patterson
INVENTOR
Walter F. Marsh.
by A. H. Evans & Co
Attorneys

UNITED STATES PATENT OFFICE.

WALTER FREDERICK MARSH, OF BENTON, IOWA.

VEHICLE-WHEEL.

SPECIFICATION forming part of Letters Patent No. 413,760, dated October 29, 1889.

Application filed April 16, 1889. Serial No. 307,470. (No model.)

*To all whom it may concern:*

Be it known that I, WALTER FREDERICK MARSH, a citizen of the United States, residing in Benton, in the county of Cass and State of Iowa, have invented certain new and useful Improvements in Vehicle-Wheels, of which the following is a full and clear description, reference being had to the accompanying drawings, forming part of this specification, in which—

Figure 1 represents a cross-sectional view of a wheel embodying my invention. Fig. 2 is a detail, to be referred to.

My invention relates to certain new and useful improvements applicable to all kinds of vehicle-wheels; and it consists in the constructions and combinations of devices which I shall hereinafter fully describe and claim.

To enable others skilled in the art to make and use my invention, I will now describe its construction and indicate the manner in which the same is carried out.

In the said drawings, A represents a wheel, the hub of which is divided, practically, into two sections B and C, the said wheel having a rim or tire b, with any well-known form of metallic brace or tension spokes or wooden spokes arranged alternately and connecting the rim with each hub-section, the said spokes being secured in or to the rim and hub-sections in any well-known manner.

The main axle D has fitted loosely thereon a two-part hollow sleeve or pipe-box H, whose outer surface is threaded, as shown in Fig. 2, and on these threaded portions the hub-sections B and C are mounted, the said sections having openings through which the sleeve passes. The threaded sleeve or box may have at one or both ends a squared portion or nut h, which may be engaged by a wrench to rotate the sections of the sleeve to cause the sections of the hub to move along the pipe-box or sleeve to increase or decrease the space between them, whereby the tension of the spokes is regulated at will.

In order that the hub-sections may be held in position after they have been once adjusted upon the threaded sleeve or box, I may employ jam-nuts a. (See Fig. 1.) The two sections of the sleeve are united at or near their inner ends, one section having a socket or hollow head l, into which a head m on the other section is passed, and held by a screw or pin engaging an annular groove in the head m; or the said sections may be united in any other suitable manner, this construction being to permit the adjustment of one of the hub-sections without disturbing the position of the other hub-section and its adjuncts. As the sections of the sleeve are set independently on the hub-sections, it is evident that I may use right and left hand screws or have both right-hand or both left-hand screws without departing from the spirit of my invention.

By means of the foregoing description it is obvious that I am enabled to construct a wheel applicable to all kinds of vehicles, and in which the two sections of the hub may be adjusted toward and from each other for the purposes before stated.

If instead of tension-spokes it be desired to use brace-spokes, I extend the spoke through the outer rim of the hub-section and secure the inner end of the spoke in a mortise in the inner section of the hub, as shown in Fig. 1. The mortise may reach through and from the outer projection or through a continuous mortise, leaving no open space between the outer projection and the inner one.

Having thus described my invention, what I claim as new, and desire to secure by Letters Patent, is—

1. In a wheel, the main axle, tire, and spokes, in combination with the sections B and C of the hub, and a threaded sleeve upon which said sections move, said sleeve being formed of two parts, one of which is formed with a socket and the other with a head adapted to fit within said socket, and a pin passing through the socket and engaging the head, whereby the two parts of the sleeve are held together, substantially as described.

2. An improved wheel, consisting of the main axle, the tire, and the spokes, the sections B and C of the hub, and the threaded sleeve upon which the sections move, said sleeve being formed in two parts, having their outer ends adapted to receive a wrench and their inner ends formed with heads adapted to be fitted together, one of said heads having an annular groove which receives a screw carried by the other head, whereby the two parts of the sleeve may be turned independently, substantially as described.

WALTER FREDERICK MARSH.

Witnesses:
LEANDER PRALL,
WILLIS HOWARD.